United States Patent [19]
Dorris, Jr.

[11] Patent Number: 5,222,295
[45] Date of Patent: Jun. 29, 1993

[54] METHOD FOR REPAIRING DIESEL ENGINE CYLINDER BLOCKS

[76] Inventor: John W. Dorris, Jr., 5005 E. Canada, Tuscon, Ariz. 85706

[21] Appl. No.: 864,801

[22] Filed: Apr. 7, 1992

[51] Int. Cl.$^5$ ................................. B23P 6/00
[52] U.S. Cl. .................... 29/888.011; 29/402.09; 29/402.12; 29/525; 29/888.061; 123/669
[58] Field of Search ............... 29/263, 402.09, 402.11, 29/402.12, 402.14, 402.18, 402.19, 458, 525, 525.1, 888.011, 888.06, 888.061; 123/193 C, 668, 669

[56] References Cited

U.S. PATENT DOCUMENTS

| | | | |
|---|---|---|---|
| 1,384,456 | 7/1921 | Eury | 29/888.011 |
| 1,842,441 | 1/1932 | Yount | 29/888.011 |
| 3,279,443 | 10/1966 | Campbell | 123/41.72 |
| 3,685,132 | 8/1972 | Hodge | 29/888.011 X |
| 3,830,209 | 8/1974 | Jones, Jr. et al. | 29/888.06 X |
| 4,229,867 | 10/1980 | Spencer | 29/888.011 |
| 4,495,907 | 1/1985 | Kamo | 123/193 C |
| 4,524,498 | 6/1985 | Hartsock | 29/888.011 |
| 4,530,141 | 7/1985 | Vachon | 29/888.011 X |
| 4,770,133 | 9/1988 | Schibalsky | 123/193 C |
| 4,862,865 | 9/1989 | Dahlen et al. | 123/669 |
| 4,921,734 | 5/1990 | Thorpe et al. | 429/34.4 |

*Primary Examiner*—Mark Rosenbaum
*Assistant Examiner*—S. Thomas Hughes
*Attorney, Agent, or Firm*—Henderson & Sturm

[57] ABSTRACT

A method and apparatus for restoring the dimensions of a worn engine cylinder block (11) to "as new" condition by the selective removal of spaced portions (20) and (30) of the cylinder block (11) followed by the replacement of the removed portions by specially contoured inserts (40) and (50) by an insert tool (70) that disposes the inserts (40) and (50) in a press-fit relationship in the cavities (20) and (30) formed by the removal process.

14 Claims, 4 Drawing Sheets

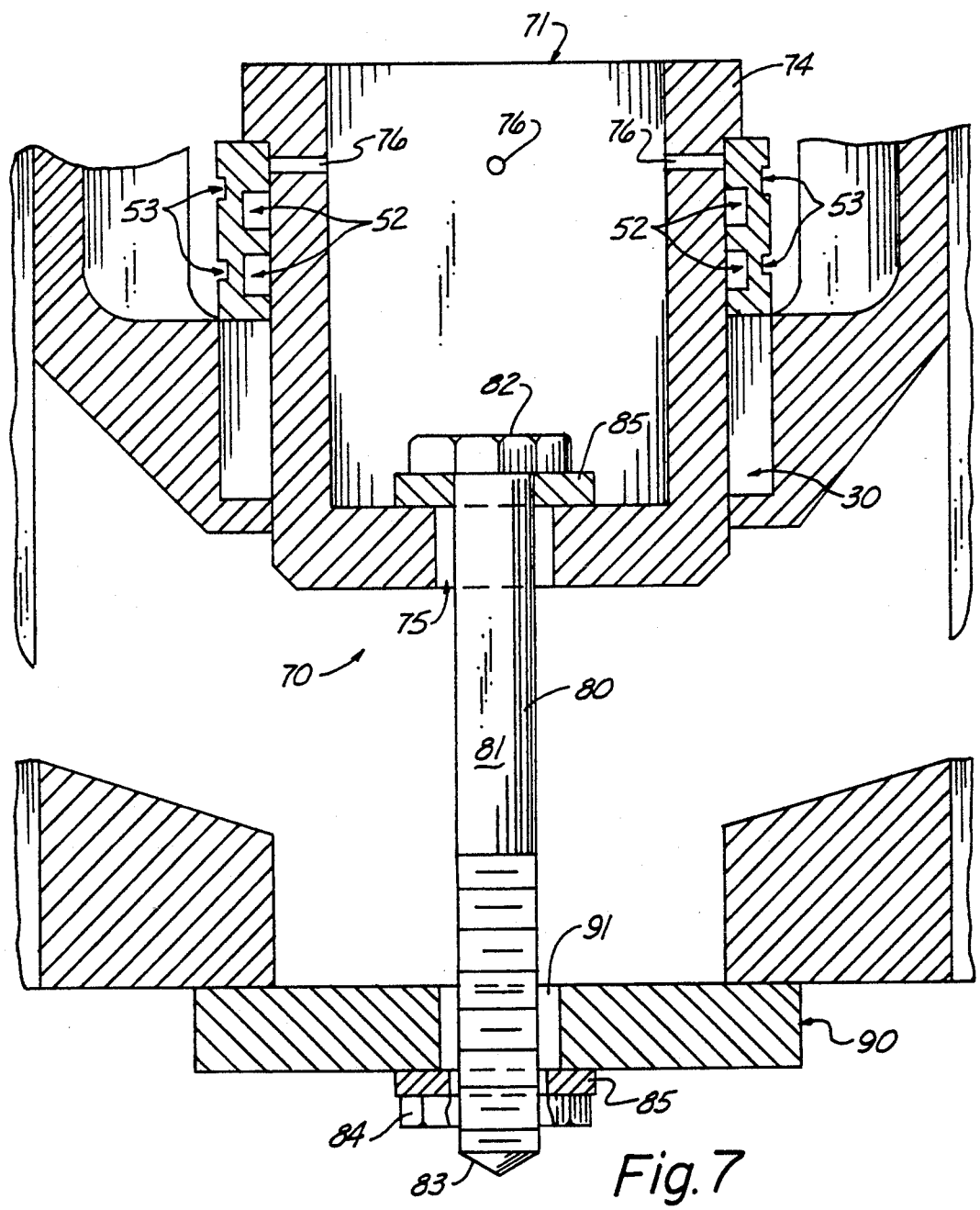

METHOD FOR REPAIRING DIESEL ENGINE CYLINDER BLOCKS

TECHNICAL FIELD

The present invention relates to the field of engine repair in general, and in particular to a method of repairing the cylinder block of a diesel engine.

BACKGROUND ART

As can be seen by reference to the following U.S. Pat. Nos. 4,495,907; 4,770,133; 4,862,865; and 4,921,734; the prior art is replete with myriad and diverse methods and apparatus for repairing cylinder blocks.

While all of the aforementioned prior art constructions are more than adequate for the basic purpose and function for which they have been specifically designed, these patented repair methods are neither suitable nor practical from a finished product or cost standpoint for use on large diesel engine cylinder blocks.

Needless to say in instances wherein fleets of diesel engine vehicles are employed, a desirable objective is to keep the engines running and serviceable for as long a time as possible to maximize the benefit derived from the investment in the vehicles.

As a consequence of the foregoing situation, there has existed a longstanding need among owners of diesel engines for a relatively simple and inexpensive method of refurbishing engine cylinder blocks to prolong the useful life of the engines without any loss of engine performance; and, the provision of such a construction is a stated objective of the present invention.

DISCLOSURE OF THE INVENTION

Briefly stated, the method and apparatus that forms the basis of the present invention comprises the selective boring of discrete portions of the cylinder block chambers followed by the insertion of specially configured inserts into the newly machined bores to replace the worn portions of the cylinder block, without the necessity of completely boring out the cylinder block and lining the bored areas with elongated cylindrical sleeve inserts.

As will be explained in greater detail further on in the specification, the discrete inserts that are employed in this invention comprise a liner spacer-seat plate insert and an O-ring groove insert that are machined to precise tolerances so as to create a press fit with the prepared counter bore and seat in each cylinder chamber.

In addition, a special installation tool is employed to insure that the inserts are properly seated within the respective cylinder chambers.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 6 is a cross-sectional view of the liner spacer-seat plate insert;

FIG. 7 is a cross sectional view of the installation tool in the process of installing the O-ring groove insert.

BEST MODE FOR CARRYING OUT THE INVENTION

Figure 1:
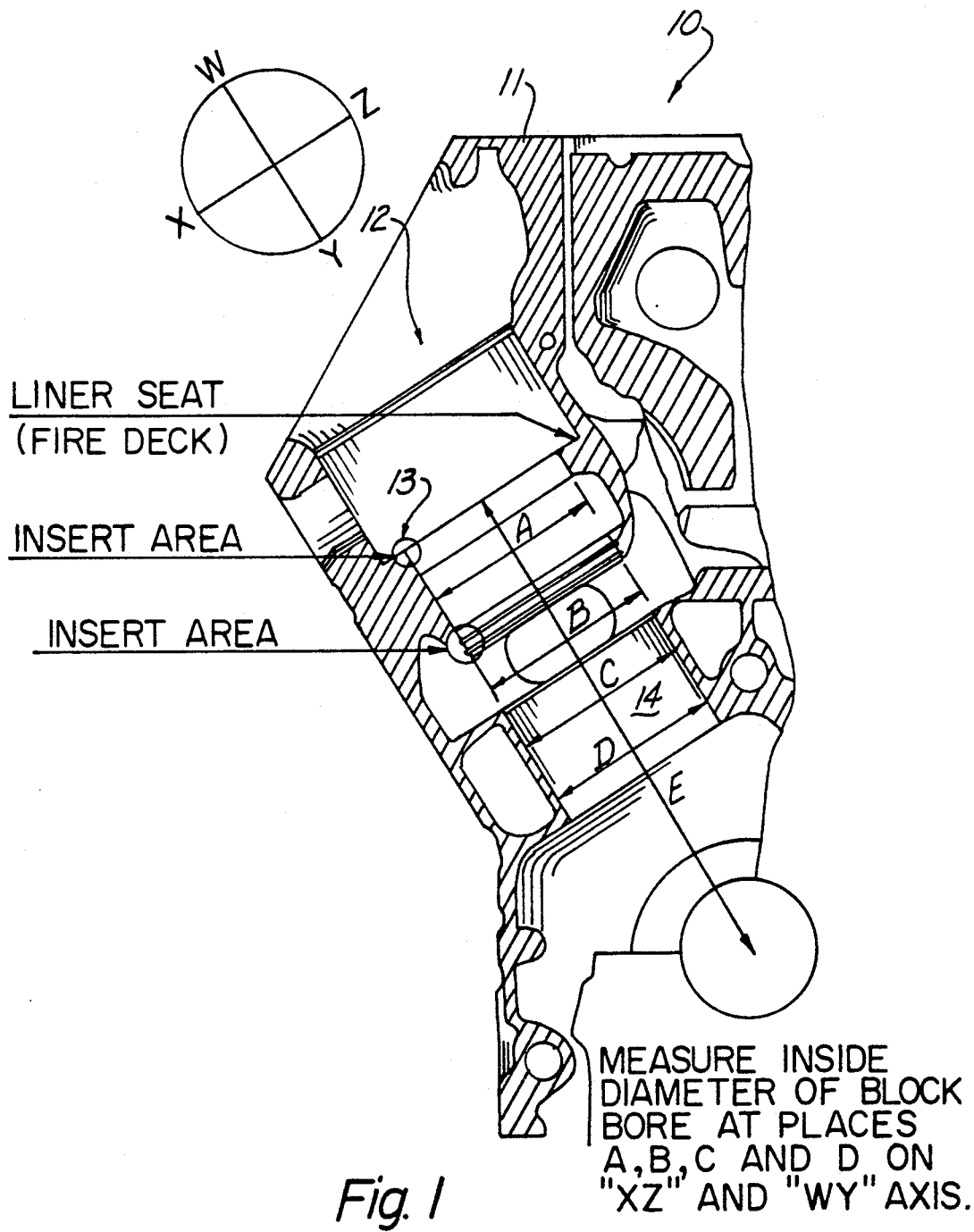
FIG. 1 is a cross-sectional view taken through a typical engine block cylinder bore prior to the implementation of the teachings of this invention.
Figure 2:
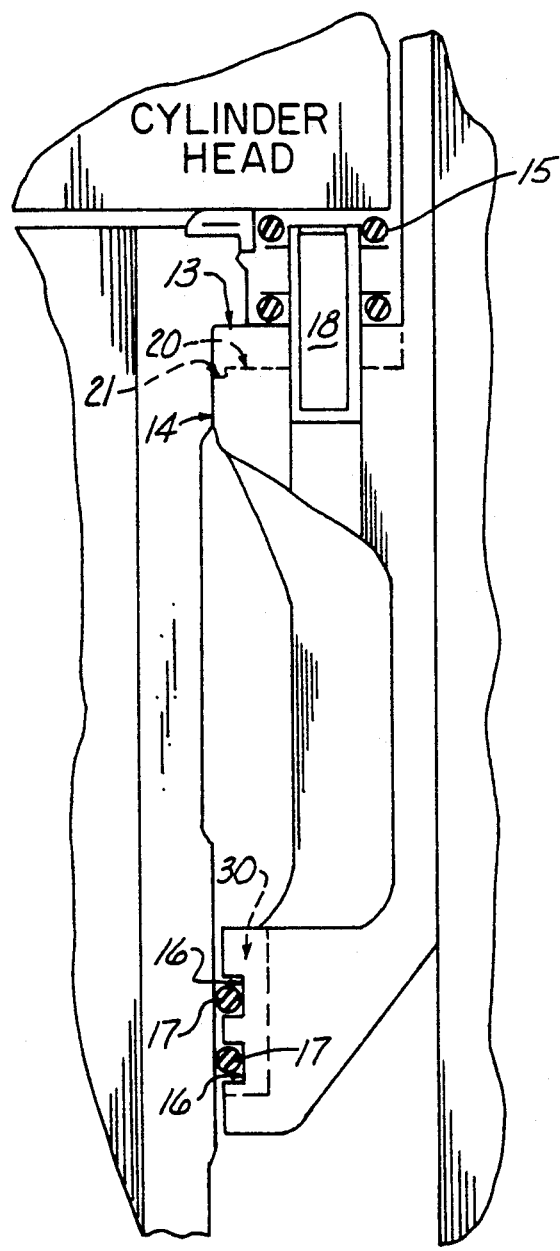
FIG. 2 is an isolated cross-sectional view of the right side of an unfurbished engine cylinder block.

As can be seen by reference to the drawings, and in particular to FIGS. 1 and 2 the engine environment in which the method and apparatus of the present invention is deployed; is designated generally by the reference numeral (10). The engine (10) comprises a cylinder block (11) equipped with a plurality of elongated stepped shoulder cylindrical bores (12); wherein the shoulder (13) defines a peripheral fire deck that surrounds a reduced diameter elongated lower cylindrical bore (14), the stepped shoulder (13) is dimensioned to accommodate a conventional liner (15), and the lower portion of the reduced diameter bore (14) is provided with a plurality of peripheral grooves (16) dimensioned to receive a plurality of conventional O-ring seals (17).

Figure 3:
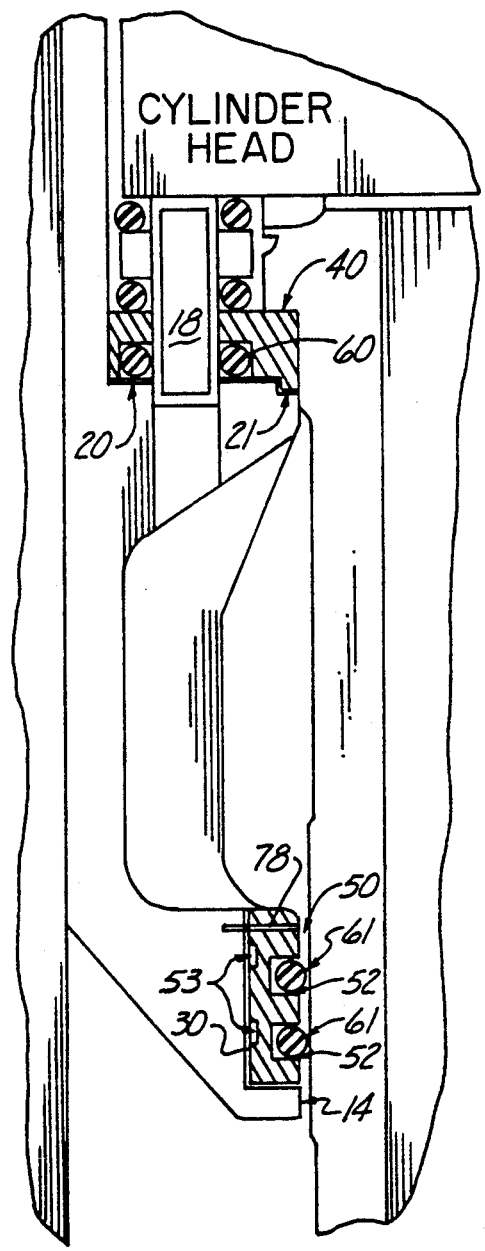
FIG. 3 is an isolated cross-sectional view of the left side of a refurbished engine cylinder block.

As can best be appreciated by reference to FIGS. 1 through 3, the preferred method of this invention first requires that the engine block is thoroughly cleaned and de-greased prior to the axial alignment of at least one of the stepped shoulder cylindrical bores (12) with a boring machine (not shown), such that there will be concentricity between the new bores indicated by dashed lines in FIG. 2 with the original bore configuration of FIGS. 1 and 2.

Once this alignment has taken place, a first counterbore (20) is formed on the inner periphery of the fire deck (13); wherein, the first counterbore (20) is further provided with a recessed peripheral lip portion (21), whose purpose and function will be explained presently.

In addition, a second counterbore (30) is formed proximate to, but spaced from the bottom of the reduced diameter bore (14) to form a recessed ledge whose purpose and function will be described presently.

As can best be appreciated by reference to FIGS. 3 and 6, the first counterbore (20) is dimensioned to receive a liner spacer seat insert (40) in a press fit relationship. The liner spacer seat insert (40) comprises a generally flat metal disk member (41) having an enlarged central aperture (42) whose diameter is equal to the reduced diameter bore (14). In addition, the disk member (41) is provided with a plurality of stepped peripheral apertures (43) wherein the reduced diameter upper portions (45) of the apertures (43) are dimensioned to receive the head bolts (18) of a conventional liner (15), and the enlarged diameter lower portion (46) of the stepped apertures (43) are intended to receive discrete O-ring seals (60) which surround the periphery of the conventional liner head bolts (18).

Furthermore, the disk member (41) is also provided with a downwardly depending central hub (44) which is dimensioned to be received in a press-fit relationship relative to the recessed peripheral lip portion (21) of the first counterbore.

Figure 4:
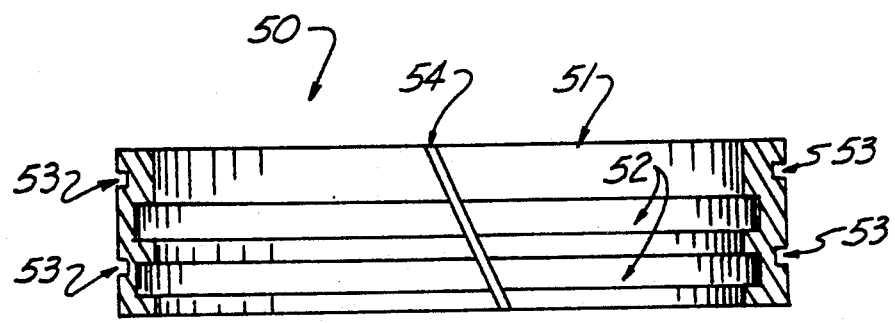
FIG. 4 is an isolated cross-sectional view of an uncompressed O-ring groove insert.
Figure 5:
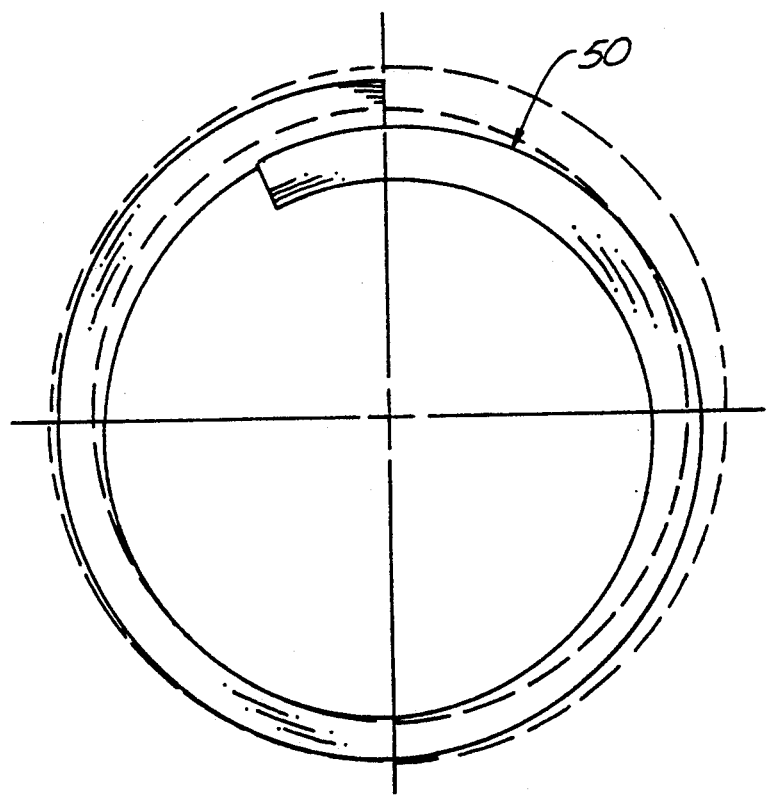
FIG. 5 is an isolated top plan view of an O-ring groove insert prior to installation.

Turning now to FIGS. 2 through 6, it can be seen that the second counterbore (30) is dimensioned to receive an O-ring seal insert (50) in a press fit relationship. The O-ring seal insert (50) comprises a split ring member (51) having a plurality of enlarged internal peripheral recesses (52) formed on the interior walls of the split ring member (51) and a plurality of shallow exterior peripheral recesses (53) formed on the external walls of the split ring member (51). In addition as shown in FIGS. 4 and 5 the split-ring member (51) is provided with a diagonal slit (54) whose purpose and function is to allow the effective external diameter of the split-ring member (51) to be compressed; so as to be received within the reduced diameter bore (14) of the cylinder block (11).

As can best be seen by reference to FIG. 3, the enlarged interior peripheral recesses (52) of the split ring member (51) are dimensioned to receive a plurality of enlarged O-ring seals (61) to replace the original O-ring seals (17); wherein, the replacement seals (61) function in the same manner, and in the same position as the original seals (17).

As was mentioned previously a new installation tool (70) has been developed to install the liner spacer seat insert (40) and the O-ring seal insert (50) into the first (20) and second (30) counterbores respectively. In as much as the installation tool (70) cooperates with the inserts (40) and (50) in much the same manner, only the cooperation between the tool (70) and the O-ring seal insert will be described herein.

As shown in FIG. 7, the insert tool (70) comprises: a generally cup-shaped insert engaging member (71); a rotatable threaded drive member (80) and an enlarged diameter bearing plate member (90). The cup shaped insert engaging member (71) is provided with an outwardly projecting flange element (74) adapted to engage the inner peripheries of the inserts (40) and (50); a central aperture (75) dimensioned to receive a portion of the rotatable threaded drive member (80); and, a plurality of discrete pilot apertures (76) disposed in the sidewalls of the insert engaging member (71) proximate the flange element (74).

The drive member (80) comprises an elongated shaft (81) having an enlarged head (82) formed on one end and a threaded portion (83) formed on the other end. In addition the drive member (80) comprises an enlarged threaded nut (84) dimensioned to engage the threaded portion (83) of the shaft (81); and, a plurality of washer bearing elements (85) disposed intermediate both: the enlarged head (82) and the insert engaging member (71); and, the threaded nut (84) and the bearing plate member (90).

The enlarged bearing plate member (90) is further provided with an enlarged central aperture (91), dimensioned to receive the shaft (81); so that the threaded portion (83) of the shaft (81) can engage the nut (84) to bring the bearing plate member (90) into engagement with the bottom of the cylinder block cylinder block (11). At this juncture the rotation of the enlarged head (82) of the drive member (80) will draw the cup shaped insert engaging member (71) downward to force the O-ring seal insert (50) into a press-fit engagement with the second counterbore (30). It should also be appreciated at this juncture, that in addition to the press-fit engagement between the inserts (40) (50) and the counterbores (20) (30); this invention further contemplates the creation of an adhesive bond between the inserts and the newly machined counterbores.

In the preferred embodiment of this invention, this adhesive bonding would be formed by coating the walls of the first (20) and second (30) counterbores with an anaerobic adhesive (not shown) with an operating range of −65° C. to +400° F. and a shear strength of not less than 3000 PSI.

Still referring to FIG. 7, it can be seen that the external peripheral recesses (53) on the O-ring seal insert (50) function as sealant grooves to accept the adhesive bonding material; wherein, the cured bonding material will form rigid inwardly projecting ribs that will fill the external peripheral recesses (53).

In addition as shown in FIGS. 3 and 7, the pilot apertures (76) in the cup shaped insert engaging member (71) are provided to allow pilot holes to be drilled through, both the O-ring seal insert (50) and the vertical cylinder walls of the second counterbore (30); when the insert (50) is seated in the desired location within the counterbore (30). These pilot holes are dimensioned to receive expandable locking pins (78) to further secure the insert (50) within the counterbore (30).

It should further be noted that given the close tolerances that are required in the particular environment in which this invention is practiced, it is probable that a final machining step will be necessary; such that the inside diameter of both inserts (40) and (50) and the crankshaft center to liner spacer seat dimensions are machine finished to the original "as new" dimensions of the cylinder bore (12).

by now it should be appreciated that the method of this invention as described herein allows an engine cylinder block (11) to be completely refurbished to an "as new" condition by: the selective removal of spaced portions of the original engine block; followed by the replacement of the removed portions by specially contoured inserts disposed in a press-fit relationship in the cavities formed by the removal process; and, finally by the machining of the inserts to restore the interior configuration of the cylinder bore to its original dimensions.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A method for refurbishing a used engine cylinder block to its "as new" dimensions comprising the steps of:
    a) aligning a boring machine along the longitudinal axis of an elongated stepped shoulder bore in the cylinder block; wherein the upper portion of said bore has an enlarged diameter; and, wherein the reduced diameter lower portion of said bore is provided with a plurality of peripheral grooves dimensioned to receive a plurality of conventional O-ring seals;
    b) removing first and second widely spaced selective portions along the longitudinal axis of the cylinder bore with the boring machine to create spaced first and second cavities within the cylinder block; wherein, said first cavity increases the depth of the enlarged diameter upper portion of said bore; and wherein the second cavity enlarges the diameter of selected portions of the reduced diameter lower portion of said bore;
    c) installing first and second replacement inserts into said first and second cavities formed in the bore; wherein, said first and second replacement inserts are configured similarly to said first and second selective portions of said bore.

2. The method as in claim 1; further including the step of:

d) forcibly inserting at least one of said first and second replacement inserts into a press fit relationship with at least one of said first and second cavities.

3. The method as in claim 2; further including the step of:

e) forming an adhesive bond between one of said replacement inserts and at least one of said cavities.

4. The method as in claim 2; further including the step of:

f) attaching at least one of the replacement inserts in at least one of the said cavities by mechanical fastening means.

5. The method as in claim 1; further including the step of:

g) removing selected portions of the first and second inserts by the boring machine to restore the engine cylinder bore to the original "as new" dimensions of the cylinder block.

6. The method as in claim 1; wherein, the stepped shoulder of the cylinder bore defines a fire deck that surrounds the reduced diameter portion of said bore; and, wherein one of said cavities comprises a first counterbore formed on the inner periphery of said fire deck.

7. The method as in claim 6; wherein, one of said replacement inserts comprises a liner spacer seat dimensioned to be received in said first counterbore.

8. The method as in claim 7; wherein, said liner spacer seat insert comprises a generally flat metal disk member having an enlarged central aperture and a plurality of peripheral apertures.

9. The method as in claim 8; wherein, in step b said first counterbore is further provided with a recessed peripheral lip portion.

10. The method as in claim 9; wherein, said liner spacer seat insert is further provided with a downwardly depending central hub which is dimensioned to be received in the recessed peripheral lip portion of said first counterbore.

11. The method as in claim 7; wherein said second cavity defines a second counterbore formed proximate to, but spaced from, the bottom of the reduced diameter portion of the original cylinder bore.

12. The method as in claim 11; wherein, said second insert comprises an O-ring seal insert dimensioned to be received in said second counterbore.

13. The method as in claim 12; wherein, said O-ring seal insert comprises a split ring member dimensioned to be received in said second counterbore.

14. The method as in claim 13; wherein, the interior walls of the split ring member are provided with at least one enlarged peripheral recess that is dimensioned to receive an O-ring seal.

* * * * *